United States Patent [19]

Kaiho et al.

[11] Patent Number: 4,528,234

[45] Date of Patent: Jul. 9, 1985

[54] TRANSPARENT LAMINATES

[75] Inventors: Keisuke Kaiho; Hidetoshi Nagata, both of Kyobashi, Japan

[73] Assignee: Toyo Ink Manufacturing Co., Ltd., Tokyo, Japan

[21] Appl. No.: 452,977

[22] Filed: Dec. 27, 1982

[30] Foreign Application Priority Data

Jan. 8, 1982 [JP] Japan .................................. 57-969
Oct. 4, 1982 [JP] Japan .............................. 57-173295

[51] Int. Cl.³ ............................................. B32B 15/08
[52] U.S. Cl. .................................... 428/216; 426/126; 427/248.1; 428/461; 428/463; 428/469; 428/458; 428/35; 428/412; 428/425.8; 428/464
[58] Field of Search ............... 428/461, 462, 458, 463, 428/35, 336, 46, 412, 425.8; 426/126; 427/248.1, 250

[56] References Cited

U.S. PATENT DOCUMENTS

| | | | |
|---|---|---|---|
| 4,232,086 | 11/1980 | Mori et al. | 428/461 |
| 4,278,716 | 7/1981 | Buchner et al. | 428/461 |
| 4,308,084 | 12/1981 | Ohtusuki | 428/461 |
| 4,329,395 | 5/1982 | Pickford | 428/461 |
| 4,350,797 | 9/1982 | Marzola et al. | 428/461 |

*Primary Examiner*—George F. Lesmes
*Assistant Examiner*—E. Rollins Buffalow
*Attorney, Agent, or Firm*—Jordan and Hamburg

[57] ABSTRACT

A transparent laminate is disclosed, which laminate comprises a transparent plastic resin film or sheet substrate (A), a thin layer (B) of at least one metal such as aluminium, tin, iron, zinc, or magnesium formed on the film or sheet substrate (A) by vacuum deposition or sputtering, and a carboxyl group-containing polyolefin layer (C) formed on the metal layer (B) by lamination. In one embodiment, the film or sheet substrate may have a silicon oxide or titanium oxide layer (D) formed thereon by vacuum deposition or sputtering of the oxide.

14 Claims, No Drawings

TRANSPARENT LAMINATES

This invention relates to transparent laminates and more particularly, to such laminates which will exhibit excellent properties especially when used as a packaging material for foods.

Studies have extensively been made to make a diversity of laminates of different types of materials in order that a variety of demands on properties of such laminates in many fields are met. Especially in the field of the food packaging, there are severe demands upon the properties of laminates including, for example, hygienic property, moisture impermeability, gas impermeability, ultraviolet rays-intercepting property, water-proof property, chemical resistance, oil resistance, low temperature endurance, thermal resistance, aging resistance, blocking resistance, heat sealability, thermal formability, transparency, adaptability for coloration, flavor retentivity, mechanical strengths, cost and flexibility.

It is actually very difficult to satisfy these requirements by use of a single material and thus use of laminates of various materials is usually made in the field of food packaging. These laminates are made by various methods which can broadly be classified into two categories, one category including a method using adhesives and the other category including a lamination technique such as heat sealing lamination and extrusion lamination without use of any adhesives. The latter method is industrially advantageous but has limitations on the combined use of different materials. Accordingly, the former method is predominantly employed at present.

Currently employed adhesives used in food packaging laminates are polyurethane type resin adhesives. Polyurethane resin adhesives exhibit excellent bonding performance but still have the problems that there is a possibility that the low molecular weight compounds contained in the resins transferred to food and that they will require aging after their application. Carboxyl group-containing polyolefins have partly been used as a substitute for the polyurethane type resins. These modified polyolefins themselves cause few hygienic problems and adhere well to polyolefins and aluminium foil, thus being useful as a material for the lamination purposes. However, the modified polyolefins adhere poorly to materials, which are ordinarily used in food packaging laminates, including, for example, polyethylene terephthalate (PET), polyvinylidene chloride, polyvinyl alcohol nylon and hydrolyzates of ethylene-vinyl acetate copolymers. Thus limitations have been placed on them in the combined use of the materials. On the other hand, use of laminates comprising aluminium foil for packaging purposes is disadvantageous in that contents in the package cannot be seen with the attendant reduction in customer appeal.

It is accordingly an object of the present invention to provide transparent laminates for packaging which overcome the drawbacks of the above prior art laminates.

It is another object of the invention to provide laminates which are transparent and have satisfactory bond strength in practical applications.

It is a further object of the invention to provide laminates for packaging which have improved oxygen gas and moisture impermeability and are adaptable for retortable package.

The present inventors made intensive studies in an attempt to eliminate drawbacks of prior art materials and, as a result of their studies, found that the above objects may be achieved by vacuum depositing or sputtering at least one member selected from the group consisting of aluminium, tin, iron, zinc and magnesium on at least one surface of a transparent plastic film or sheet (hereinafter referred to simply as "film" for brevity) substrate (A) with or without a silicon oxide or titanium oxide layer (D) formed on one or both surfaces thereof by vacuum deposition or sputtering of the oxide, to form thereon a metal layer (B) having a thickness of up to 100 angstrom and then laminating a carboxyl group-containing polyolefin layer (C) on the thus formed metal layer thereby to obtain a laminate having satisfactory transparency and bond strength. The layer (C) may be formed by heat seal laminating or extrusion laminating the carboxyl group-containing polyolefin. This invention is based on this finding or discovery. The present inventors found that although the metal or metals are deposited on the plastic film substrate, the resulting laminate is transparent since the resulting metal layer is very thin and has satisfactory adhesion or bond strength since a secure bond is effected between the film substrate and carboxyl group-containing polyolefin layer due to the presence of the metal layer therebetween, and that, moreover, vacuum deposition or sputtering of titanium oxide or silicon oxide on one or both sides of the plastic film substrate results in a remarkable improvement in oxygen gas and moisture impermeability while retaining the transparency of the laminate. The latter type of the laminate is particularly suitable for retortable package.

The plastic resin film substrate (A) is formed, in the practice of the invention, of polyesters, nylons, polyvinylidene chloride, polyvinyl chloride, polyvinyl alcohol, saponified products of ethylenevinyl acetate copolymers, polycarbonates, polystyrene, acrylic type resins, epoxy resins, urethane resins, cellophane, modified polyolefin type resins and the like. The film substrates so formed may be used without being treated on the surface thereof or may be subjected to physical surface treatments such as sand blasting or to chemical surface treatments such as corona discharging and application of a primer in order to improve their bond strengths.

Methods for forming a vacuum deposited or sputtering layer (C) of aluminium, tin, iron, zinc and/or magnesium on the surface of a plastic resin film substrate are known per se. That is, aluminium, tin, iron, zinc and/or magnesium is vacuum deposited or sputtered in an inert gas such as argon on the substrate. When at least one of these metals is formed in a thickness of over 100 angstrom on the substrate, the transparency thereof is spoiled and thus, the purpose of the invention will not be attained. Additionally, too great a thickness does not contribute to improving the bond strength. Accordingly, a thinner metal layer is more preferable and thus the layer should range from a monomolecular layer to 100 angstrom, preferably several monomolecular layers to several tens angstrom.

The carboxyl group-containing polyolefins (B) used in the present invention are those obtained by copolymerizing olefinic monomers such as ethylene, propylene, butene and the like with $\alpha,\beta$-unsaturated carboxylic acids such as acrylic acid, methacrylic acid, itaconic acid, fumaric acid, maleic acid and maleic anhydride, or those obtained by graft-polymerizing olefin polymers with the α,β-unsaturated carboxylic acids. These acids may partly be substituted by (meth)acrylic esters in an amount by weight of preferably up to 10% as required. The amount of the α,β-unsaturated carboxylic acid used is preferably in the range of 0.01 to 20 parts by weight per 100 parts by weight of the olefin component. Too small amounts are disadvantageous in that satisfactory bond or adhesion strength cannot be obtained, whereas too large amounts do not contribute to the improvement of the adhesion with a decrease in resistance to aqueous solutions of alkalies. These carboxyl group-containing polyolefins may be used singly or in combination with non-modified polyethylene or polypropylene, or may be used in admixture with metal compounds, the mixture being called ionomers. Examples of the metal compounds include oxides, hydroxides, carbonates and acetates of sodium, potassium, zinc, iron, magnesium, tin, aluminium, copper and nickel. These metal compounds can be added in an amount of up to 20 parts by weight per 100 parts by weight of the carboxyl group-containing polyolefin. The modified polyolefin shows good adhesiveness when used in an amount of at least 0.1 wt%, preferably 5 wt% or more, of non-modified polyolefins.

Methods for vacuum depositing or sputtering silicon oxide on one or both surfaces of a plastic resin film substrate are known per se. For example, there are used a method for the vacuum deposition of silicon monoxide or silicon dioxide, a method for sputtering the oxide in an inert gas such as argon gas and a method for sputtering silicon in an oxygen gas. Titanium oxide can likewise be vacuum deposited or sputtered to form its layer on one or both sides of the substrate.

The thickness of the silicon oxide or titanium oxide layer varies depending on the degree of gas impermeability required and an appreciable effect is attained when the thickness is of the order of several hundreds angstrom as will be discussed hereinafter.

The laminate according to the present invention can be made by the following procedure. A plastic resin film substrate (A) with or without a vacuum deposited or sputtered layer of silicon oxide or titanium oxide formed on one or both surfaces thereof is covered with a layer (B) of a metal such as Al, Sn, Fe, Zn or Mg by vacuum deposition or sputtering thereof. On the metal layer is further formed a carboxyl group-containing polyolefin layer (C) by extrusion lamination of this polyolefin or heat seal lamination thereof under heating and pressurizing conditions. The thickness of the silicon oxide or titanium oxide to be formed varies depending on the degree of gas impermeability required, and even a thickness of several tens angstrom is considerably effective for this purpose. In the case of heat seal lamination, the pretreatment of corona discharge of the carboxyl group-containing polyolefin film (C) makes it possible to improve its adhesiveness to the metallic layer. The silicon oxide or titanium oxide layer (D) may be formed preferably on one or both surfaces of the film substrate (A).

Typical examples of the laminates of the invention include a PET/Al layer/carboxy group-containing polyolefin (which may be abbreviated as "modified PO" hereinafter) laminate, a PET/Al layer/modified PO/polyolefin (which may be abbreviated as "PO" hereinafter) laminate and a PET/Al layer/modified PO-PO mixture laminate. In the above examples, PET may be substituted with nylon for using the laminates as transparent packaging material. In cases where impermeability or moisture-proof property is required in laminates, a PET (or nylon)/adhesive/poval (and/or saponified product of ethylene-vinyl acetate copolymer and/or polyvinylidene chloride)/Al or Sn layer/modified PO/(PO, this PO being optional) laminate and a PET (or nylon)/polyvinylidene chloride film /Al layer/modified PO/(PO) laminate may conveniently be used. As a matter of course, Al may be replaced by Sn, Fe, Zn or Mg in the preparation of such laminates as mentioned above.

Laminates in which the titanium or silicon oxide layer is formed on one or both sides of the substrate according to this invention, include, for example, a PET/silicon oxide layer/Al layer/modified PO/(PO) laminate, a nylon/silicon oxide layer/Al layer/modified PO/(PO) laminate, a silicon oxide layer/PET/Al layer/modified PO/(PO) laminate, a stretched polypropylene layer/silicon oxide layer/Al layer/modified PO/(PO) laminate, a silicon oxide layer/nylon/silicon oxide layer/Al layer/modified PO/PO laminate, a silicon oxide layer/stretched polypropylene/silicon oxide layer/Al layer/modified PO/PO laminate, and laminates which are the same as the above-mentioned ones except that the silicon oxide is replaced by titanium oxide or the Al is replaced by Sn, Fe, Zn or Mg.

Polyvinyl alcohol or a partially saponified product of ethylene-vinyl acetate copolymers, which has heretofore been used as a material having excellent oxygen gas impermeability, has the drawback that its moisture permeability (or water vapor transmission) is great. This can be overcome by combination of said material with a titanium or silicon oxide layer which is excellent in moisture (water vapor) impermeability. The resulting laminates have excellent oxygen gas and moisture impermeability and they are exemplified by a PET/adhesive (e.g. urethane adhesive)/silicon oxide or titanium oxide layer/partially saponified product of ethylene-vinyl acetate copolymer/Al layer/modified PO/(PO) laminate or laminates which are the same as the above laminate except that the Al is replaced by another metal such as Sn, Fe, Zn or Mg, exhibit satisfactory gas and moisture impermeability.

The present invention is particularly, described by way of the following examples.

EXAMPLE 1

A substrate of a biaxially oriented polyethylene terephthalate film (12 microns in thickness) with an about 20 angstrom aluminium layer deposited thereon was laminated with a film (40 microns) of maleic anhydride-grafted polypropylene (grafting rate 0.1%) at 200° C. under a line pressure of 5 kg/cm to obtain a laminate. The bond strength of the laminate was measured by the T-type peeling test using a 15 mm wide test piece and was found to be at least 1.5 kg/15 mm.

EXAMPLE 2

The procedure of Example 1 was repeated except that the polyethylene terephthalate was substituted by the plastic resin films indicated in Table 1. The peeling strength of each of the resulting laminates is shown below.

TABLE 1

| Plastic substrate | Peeling Strength (kg/15 mm) |
|---|---|
| Uniaxially stretched film of saponified product of ethylene- | at least 1.5 |

TABLE 1-continued

| Plastic substrate | Peeling Strength (kg/15 mm) |
|---|---|
| vinyl acetate copolymer (15 microns) | |
| Polycarbonate film (200 microns) | " |
| Hard vinyl chloride resin sheet (50 microns) | 1.0 |
| Polystyrene sheet (100 microns) | at least 1.5 |
| Polymethylmethacrylate sheet (1000 microns) | at least 1.5 |

COMPARATIVE EXAMPLE 1

The procedure of Example 1 was repeated except that a corona discharged polypropylene film was used instead of the maleic anhydride-grafted polypropylene film. As a result, it was found that the film did not adhere to the metal layer.

EXAMPLE 3

An about 10 angstrom thick aluminium thin layer was vacuum deposited on a biaxially oriented polyester film (12 microns), on which an ionomer resin (available under the name of Himilan from Mitsui Polychem. Co., Ltd.) was formed on a thickness of about 30 microns by extrusion lamination. The peeling strength of the resulting laminate was 1.0 kg/15 mm.

EXAMPLE 4

The procedure of Example 2 was followed using tin instead of the aluminium, with the result that a similar peeling strength was obtained.

EXAMPLE 5

The procedure of Example 2 was repeated except that substantially equal amounts of aluminium and tin were used for vacuum deposition instead of the aluminium, with the result that a similar peeling strength was obtained.

EXAMPLE 6

The procedure of Example 1 was repeated except that the maleic anhydride-grafted polypropylene film was preliminarily corona discharged, and the resulting laminate had a peeling strength of at least 1.5 kg/15 mm and the film itself underwent cohesion destruction.

EXAMPLE 7

On a biaxially oriented polyethylene terephthalate film substrate (12 microns) was formed a silicon oxide layer in different thicknesses by vacuum deposition, on which was further vacuum deposited an about 20 angstrom thick aluminium layer. The substrate with the two layers formed thereon was laminated on the aluminium layer with a maleic anhydride-grafted polypropylene (grafting rate 0.1%) film (40 microns) at 200° C. under a line pressure of 5 kg/cm to obtain a laminate. The laminate so obtained had a bond strength of at least 1.5 kg/15 mm as determined by a T-type peeling test. Each of the laminates was measured for its rate of oxygen gas transmission by the equal pressure method and rate of water vapor transmission with the results shown in Table 2 below.

TABLE 2

| Thickness of SiO Deposited Layer (A) | (Note 1) Rate of Oxygen Gas Transmission | (Note 2) Rate of Water Vapor Transmission |
|---|---|---|
| 0 | 82 | 2.9 |
| 250 | 52 | 2.1 |
| 450 | 19 | 1.3 |
| 700 | 5 | 0.9 |
| 1500 | 2 | 0.5 |
| 2200 | 1 | — |

(Note 1) Unit: ml/m$^2$ .1 atm. 24 hours. 25° C.
(Note 2) Measured by the cup method prescribed in JIS Z 0208 (40° C. R.H. 90%). Unit: g/m$^2$ .24 hours The laminate having a 250 angstrom thick SiO layer was subjected to retort treatment at 121° C., after which its bond strength was measured and found to be 600 g/15 mm. This strength is considered sufficient to stand use in practical applications.

EXAMPLE 8

The procedure of Example 7 was repeated using a nylon film (15 microns) instead of the polyethylene terephthalate film and using tin instead of the aluminium. As a result, it was found that the resulting laminate had a peeling strength of at least 1.5 kg/15 mm and a rate of oxygen gas transmission of 1.1 ml/m$^2$.24 hours.1 atm.25° C.

COMPARATIVE EXAMPLE 2

The procedure of Example 8 was repeated except that tin was not vacuum deposited but silicon monoxide alone was deposited. As a result, the peeling strength of the resulting laminate was found to be 50 g/15 mm in width.

EXAMPLE 9

On a biaxially oriented polyethylene terephthalate film (12 microns) was formed a 500 angstrom silicon dioxide layer and on the thus formed layer was then formed an about 10 angstrom aluminium thin layer each by vacuum deposition. On this aluminum layer was further laminated on about 30 micron thick ionomer resin layer (the same in Example 3) by extrusion lamination. The resulting laminate had a peeling strength of 1.0 kg/1.5 mm and a rate of oxygen gas transmission of 1.5 ml/m$^2$.24 hours.1 atm.25° C.

EXAMPLE 10

The procedure of Example 7 was repeated using instead of the aluminium a mixture of aluminium and tin in almost equal amounts. As a result, it was found that the peeling strength and the rate of oxygen gas transmission of the resulting laminate were similar to those of Example 7.

EXAMPLE 11

Silicon monoxide was vacuum deposited in a thickness of about 600 angstrom on one surface of a nylon film (15 microns) and aluminium was vacuum deposited on the other surface of the film in a thickness of about 20 angstrom. Thereafter, a modified polypropylene film was applied onto the aluminium deposited surface under pressure similar to the procedure of Example 7 to obtain a laminate. This laminate had a bond strength of at least 1.5 kg/mm and a rate of oxygen gas transmission of 1.2 ml/m$^2$. 24 hours.1 atm.25° C. This laminate did not deteriorate in bond strength after having been subjected to retort treatment in a manner similar to Example 7.

EXAMPLE 12

A polyethylene terephthalate film as used in Example 1 and a film (15 microns) of a saponified product of ethylene-vinyl acetate copolymer were laminated together using a urethane adhesive therebetween. Then, silicon monoxide was vacuum deposited on the film of the saponified product, followed by vacuum depositing aluminium in a thickness of 20 angstrom and laminating a modified polypropylene film on the silicon monoxide-deposited film in the same manner as in Example 7 thereby obtaining a laminate.

The thus obtained laminate had a bond strength of at least 1.5 kg/15 mm and a rate of oxygen gas transmission of below 1 ml/m$^2$.1 atm.24 hours.25° C. The rate of water vapor transmission for different thicknesses of the SiO film is as shown in Table 3.

TABLE 3

| Thickness of SiO Deposited on Film (Angstrom) | Water Vapor Transmission |
| --- | --- |
| 0 | 14.2 |
| 220 | 10.3 |
| 450 | 8.6 |
| 680 | 7.2 |
| 900 | 6.0 |
| 1120 | 5.0 |

EXAMPLE 13

A uniaxially oriented nylon film (15 microns) was subjected to vacuum deposition of iron on one surface thereof in a thickness of about 30 microns and sputtering of metallic titanium on the other surface in an atmosphere of oxygen gas to form an about 800 angstrom thick titanium oxide layer thereon. A maleic acid-grafted polypropylene (grafting rate 0.2%) film (20 microns) was pressure laminated on said iron deposited surface at 200° C. under a line pressure of 5 kg/cm to obtain a transparent laminate. This laminate had a bond strength of at least 1.5 kg/15 mm and a rate of oxygen gas transmission of 2 ml/m$^2$.atm.24 hours.25° C.

EXAMPLE 14

The procedure of Example 13 was repeated using zinc and magnesium instead of the iron thereby obtaining transparent laminates having good bond strength and good oxygen gas impermeability.

EXAMPLE 15

The procedure of Example 7 was repeated using titanium monoxide instead of the silicon monoxide in different thicknesses thereby obtaining laminates having bond strengths of at least 1.5 kg/15 mm with good oxygen gas and water vapor impermeability as shown in Table 4 below, respectively.

TABLE 4

| Thickness of TiO Deposited on Film (angstrom) | Rate of Oxygen Gas Transmission | Rate of Water Vapor Transmission |
| --- | --- | --- |
| 0 | 82 | 2.9 |
| 250 | 48 | 2.0 |
| 450 | 20 | 1.5 |
| 700 | 8 | 1.0 |
| 1500 | 1.5 | 0.6 |

EXAMPLE 16

The procedure of Example 7 was repeated except that a uniaxially oriented nylonfilm (15 microns) was used instead of the biaxially oriented polyethylene terephthalate film and titanium monoxide (thickness 450 angstrom) was used instead of the silicon monoxide. The resulting laminate had a bond strength of at least 1.5 kg/1.5 mm and did not deteriorate in bond strength at all after being subjected to retort treatment in the same manner as in Example 7.

What is claimed is:

1. A transparent laminate comprising a transparent plastic resin film or sheet substrate (A), a thin layer (B) of at least one metal selected from the group consisting of aluminium, tin, iron, zinc and magnesium, said layer being formed on said plastic resin film or sheet substrate (A) by vacuum deposition or sputtering of the metal thereon and having a thickness ranging from monomolecular to 100 angstrom, and a carboxyl group-containing polyolefin layer (C) formed on said metal layer (B) by lamination.

2. A transparent laminate according to claim 1, wherein said metal layer (B) has a thickness of more than 1 monomolecular layer.

3. A transparent laminate according to claim 1, wherein the carboxyl group-containing polyolefin is a copolymer of an olefin monomer and an α,β-unsaturated carboxylic acid or its anhydride.

4. A transparent laminate according to claim 1, wherein the carboxyl group-containing polyolefin is a polyolefin grafted with an α,β-unsaturated carboxylic acid or its anhydride.

5. A transparent laminate according to claim 3, wherein the amount of the unsaturated carboxylic acid or its anhydride used is in the range of 0.01 to 30 parts by weight per 100 parts by weight of the olefin component.

6. A transparent laminate according to claim 1, wherein the carboxyl group-containing polyolefin is admixed with at least 0.5 wt.% of polyethylene or polypropylene.

7. A transparent laminate according to claim 1, wherein the carboxyl group-containing polyolefin is admixed with up to 20 parts by weight, based on 100 parts by weight of said polyolefin, of a metal compound selected from the group consisting of oxides, hydroxides, carbonates and acetates of sodium, potassium, zinc, iron, aluminium, magnesium, and tin.

8. A transparent laminate according to claim 1, wherein said plastic resin film or sheet substrate is covered with a member selected from the group consisting of a silicon oxide layer and a titanium oxide layer on one or both surfaces of the substrate by vacuum deposition or sputtering of the metal oxide layer thereon.

9. A transparent laminate according to claim 8, wherein said vacuum deposited or sputtered metal oxide layer has a thickness of several hundreds angstrom.

10. A transparent laminate according to claim 4, wherein the α,β-unsaturated carboxylic acid or its anhydride is partly substituted by a (meth)-acrylic ester.

11. A transparent laminate according to claim 4, wherein the amount of the unsaturated carboxylic acid or its anhydride used in the range of 0.01 to 30 parts by weight per 100 parts by weight of the olefin component.

12. A transparent laminate according to claim 3, wherein the $\alpha,\beta$-unsaturated carboxylic acid or its anhydride is partly substituted by a (meth)-acrylic ester.

13. A transparent laminate according to claim 1, wherein said film substrate is subjected to physical or chemical surface treatments to improve bond strength.

14. A transparent laminate comprising a transparent plastic resin film or sheet substrate (A), a thin layer (B) of at least one metal selected from the group consisting of aluminium, tin, iron, zinc and magnesium, said layer being formed on said plastic resin film or sheet substrate (A) by vacuum deposition or sputtering of the metal thereon and having a thickness ranging from monomolecular to 100 angstrom, and a carboxyl group-containing polyolefin layer (C) formed on said metal layer (B) by lamination, the laminate of plastic resin film or sheet substrate (A), metal layer (B), and carboxyl group-containing polyolefin layer (C) having the property of being transparent even though said metal layer (B) is utilized in the laminate due to the thinness of said metal layer (B).

* * * * *